Patented June 28, 1949

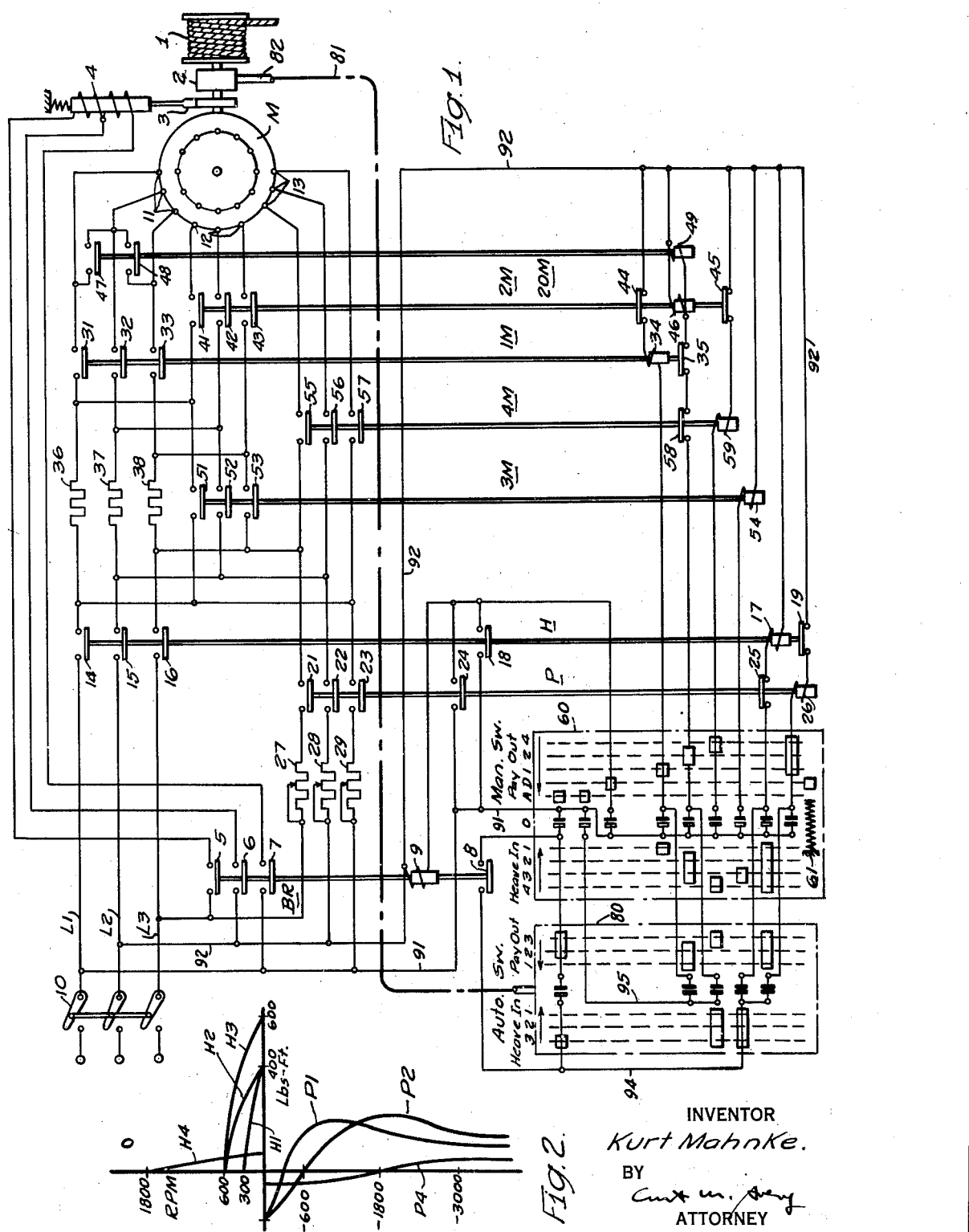

2,474,267

UNITED STATES PATENT OFFICE 2,474,267

ELECTRIC WINCH CONTROL SYSTEM FOR ALTERNATING CURRENTS

Kurt Mahnke, Alden, N. Y., assignor to Westinghouse Electric Corporation, East Pittsburgh, Pa., a corporation of Pennsylvania Application February 28, 1948, Serial No. 12,097

7 Claims. (Cl. 318—6)

1

My invention relates to electric control systems for winches such as warping or mooring winches, towing winches, cable laying reels, or the like machinery.

It is an object of the invention to devise control equipment that is capable of an automatic performance in response to the pull, tension, or payed-out length of the winch rope and permits using an alternating-current motor for controlling the winch drive to maintain the pull, tension, or length of the cable within the desired limits.

Another object of the invention is to devise an alternating-current winch control system which permits operating the winch motor at selective speeds in heave-in and pay-out directions in such a manner that the maximum torque of the motor is smaller when paying out than when heaving in so that protection is provided against the occurrence of excessive rope tension due to winch friction rope, when paying out, without necessitating additional protective control switches.

These and other objects, as well as the means provided by the invention for achieving the objects, will be apparent from the following description of the embodiment exemplified in the drawing by a circuit diagram of a marine winch shown in Fig. 1 and an explanatory diagram of speed-torque characteristics shown in Fig. 2.

In Figure 1, the winch drum 1 is connected through a gear box 2 with an alternating-current winch motor M and is equipped with a normally-set friction brake 3 which has an electromagnetic release magnet 4. The brake magnet is controlled by contacts 5, 6 and 7 of a brake relay BR which has a self-holding contact 8 and a relay coil 9. Brake coil, motor, brake relay, and all other relays described hereinafter are energized from alternating-current leads L1, L2, L3 through a main switch 10 which is closed when the system is in operative condition.

The motor M is of the multi-speed squirrel-cage type. That is, it is equipped with several stator windings or winding sections for producing motor fields of respectively different pole numbers. In the illustrated example, the motor is assumed to have two such stator windings. One winding is subdivided to produce either a field with 24 poles for operation at 300 R. P. M. or a field with 12 poles for operation at 600 R. P. M., depending upon how the two parts of the winding are connected. The motor terminals for operation at 300 R. P. M. are denoted by 11. Those for operation at 600 R. P. M. are

2 denoted by 12. Terminals 11 are to be short circuited when terminals 12 are energized. The other field winding is connected to the terminal group 13 and designed for producing a motor field with four poles for operation at 1800 R. P. M.

The energization of the motor terminal groups from the leads L1, L2, L3 is controlled by two reversing relays P and H, and also by contactors denoted by 1M, 2M, 20M, 3M and 4M. Relay H (heave-in relay) has three main contacts 14, 15, 16 controlled by a coil 17 which actuates also two interlock contacts 18, 19. Relay P (pay-out relay) has three main contacts 21, 22, 23 and two interlock contacts 24, 25 under control by a coil 26. The polarity or phase sequence of connection of relay H is different from that of relay P, so that, when relay H is energized, the phase sequence of the voltage applied to the motor is such as to produce motor torque in the heave-in direction while when relay P is energized, the phase sequence is reversed to produce motor torque in the pay-out direction. Interposed between the supply leads L1, L2, L3 and the contacts 21, 22, 23 of the pay-out relay P are three resistors 27, 28, 29. It will be recognized that these resistors are series connected to the motor only when the motor is to operate in the pay-out direction. These resistors then have the effect of limiting the maximum torque and maximum current of the motor to values lower than the respective values possible during heave-in operaion.

The contactor 1M has main contacts 31, 32, 33 connected to the terminal group 11 for lowest motor speed and controlled by a coil 34 which also actuates an interlock contact 35. Three resistors 36, 37, 38 are series connected between contacts 31, 32, 33 and the main contacts of relays P and H. These resistors are effective in the motor circuit during both heave-in and pay-out operations unless they are short circuited by the contactor 3M. The contactor 2M has main contacts 41, 42, 43 disposed between the terminal group 12 for medium speed and the resistors 36, 37, 38. Contactor 2M has also two interlock contacts 44, 45 and a coil 46. Relay 20M has two contacts 47, 48 for short circuiting the terminals 11 under control by a coil 49. The contacts of relay 3M for short circuiting resistors 36, 37, 38 are denoted by 51, 52, 53. The appertaining relay coil is denoted by 54. Relay 4M has main contacts 55, 56, 57 and an interlock contact 58 under control by a coil 59. Contacts 55, 56, 57 are connected between the terminal group 13 and the main contacts of relays P and H so as to bypass the resistors 36, 37 and 38.

The above-mentioned relays and contactors are controlled by a manually operable selector switch (master switch) denoted as a whole by 60, and by an automatic selector switch denoted as a whole by 80.

Selector switch 60 has an "off" position denoted by O and several operating positions denoted by heave-in 1, 2, 3, 4 and pay-out 1, 2, 4. In addition, switch 60 has an automatic position A to which the switch must be adjusted in order to put the automatic switch 80 in operation. Switch 60 has also a drift position D in which the motor M remains deenergized while the brake 3 is lifted in order to make the winch or rope freely revolvable. A spring mechanism, schematically shown at 61, serves to bias the switch 60 from position D and pay-out positions 1, 2 and 4 toward position A. That is, the switch 60 will remain in the positions D and at pay-out points 1, 2 and 4 only as long as the switch is held in these positions by the operator, but will automatically turn to position A when the operator releases the switch.

Switch 80 has several pay-out positions and several heave-in positions. It is connected through a suitable transmission, here schematically represented by a dot and dash line 81, to an output shaft 82 of the gear box 2. The purpose of this transmission between switch 80 and motor M is to control the switch in dependence upon the departure of the winch or rope condition from a given operating range. The gear 2 may consist of a tensiometric device well known for the automatic control of towing winches. Such a tensiometric device consists essentially of a differential or planetary gearing whose two input shafts are connected to the motor and the winch drum respectively while the differential member is attached to the control switch and is biased by a spring to deflect from its normal position of rest only when the difference between motor torque and drum torque exceeds given limits, the direction of deflection being in accordance with the direction of the differential torque value. Since such tensiometric devices are well known as will be seen, for instance, from United States Patents 2,393,048 and 2,414,473, and since the particular design of the condition-responsive device is not an essential feature of the invention proper, the details of this device are not illustrated in the drawing. It should be understood that, if desired, the shaft 82 may be connected with the motor shaft by a limit device so that shaft 82 is turned only when the length of rope paid out by the winch drum exceeds adjusted limit values. Such limit devices are also well known in the art for winch control purposes.

The two switches 60 and 80 are represented in developed form and by the schematic illustration customary for cam controlled master switches. If desired, however, drum type controllers or contact devices of any other suitable type may be used instead.

It is assumed in the following description of the operation of the system that switch 10 is closed and that the leads L1, L2, L3 are properly energized.

Manual operation

Point 1—Pay-out: When the manual switch 60 is moved from the off position through positions A and D to position 1, pay-out, coil 26 of relay P is energized in the circuit L1—91—60—26—19—92—L2. Relay P picks up and energizes coil 9 of brake relay BR in the circuit L1—91—24—9—92—L2. Brake 3 is released and contacts 21, 22, 23 of relay P close. Contact 1M picks up because its coil 34 is energized in the circuit L1—91—60—34—44—92—L2 so that contacts 31, 32, 33 close. Terminal group 11 of motor M is now energized through contacts 31, 32, 33, resistors 36, 37, 38, contacts 21, 22, 23 and resistors 27, 28, 29. Motor M runs at 300 R. P. M. (synchronous speed in the heave-in direction. A typical speed torque characteristic corresponding to this performance is shown at P1 in Fig. 2.

Point 2—Pay-out: When switch 60 is moved to position 2, pay-out, contactor 1M drops out and coils 48 and 49 of contactors M2 and M20 are energized so that these contactors pick up. Now, the terminal group 11 is shorted at contacts 47, 48 and the terminal group 12 is energized through contacts 41, 42, 43 and resistors 36, 37, 38 and 27, 28, 29. The motor now runs in the pay-out direction at 600 R. P. M. with a speed torque characteristic typified by curve P2 in Fig. 2.

Point 4—Pay-out: Contactors M2 and M20 drop out and coil 59 of contactor 4M is energized so that contactor 4M applies voltage to terminal group 13 through contacts 55, 56, 57. The resistors 36, 37, 38 are no longer effective, while resistors 27, 28, 29 remain series-connected in the motor circuit. The motor now runs at 1800 R. P. M. with a speed torque characteristic as exemplified by the curve P4 in Fig. 2.

Point 1—Heave-in: Coil 17 of relay H is energized in all heave-in positions so that contacts 14, 15, 16 are closed. Contact 18 energizes the brake relay coil 9 so that the brake is released. When switch 60 is in position 1, heave-in, the coil 34 of contactor 1M is also energized so that contacts 31, 32, 33 are closed. Terminal group 11 is energized through contacts 31, 32, 33, resistors 36, 37, 38 and contacts 14, 15, 16. Motor M runs in the heave-in direction at 300 R. P. M. with resistors 36, 37, 38 effective to limit motor current and torque though in a lesser degree than during pay-out performance because resistors 27, 28, 29 are not effective in any heave-in position. An example of a corresponding motor characteristic is represented by curve H1 in Fig. 2.

Point 2—Heave-in: Contactor 1M drops out and contactors 2M and 20M pick up. Motor M is energized at terminal group 12 through contacts 41, 42, 43, resistors 36, 37, 38 and contacts 14, 15 and 16. Terminal group 11 is shorted at contacts 47, 48. The speed torque characteristic of motor M under these conditions is represented by curve H2 in Fig. 2.

Point 3—Heave-in: Contactors 2M and 20M remain picked up, and contactor 3M picks up in addition. Hence, the motor energizing circuit remains the same as for point 2, heave-in, except that the contacts 51, 52, 53 of contactor 3M short the resistors 36, 37, 38 and permit the motor to draw more current. Hence the motor may develop a higher heave-in torque as exemplified by the characteristic H3 in Fig. 2.

Point 4—Heave-in: Contactors 2M, 20M and 3M drop out. Contactor 4M picks up and energizes terminal group 13 through contacts 55, 56, 57 and contacts 14, 15, 16. Motor M runs in heave-in direction at 1800 R. P. M. with a speed torque characteristic as exemplified by curve H4 in Fig. 2. The motor field winding now energized has a considerably higher resistance than the one previously effective so that current and torque are reduced accordingly.

Automatic operation

During towing or warping, the winch rope is to be automatically held within given limits of rope tension (or within given limits of paid-out rope length). This automatic performance is effected by the switch 80 when the manual switch 60 is placed in the automatic position A. As long as the cable pull remains within the desired limits, switch 80 is in the off position in which the brake 3 is set and the whole system deenergized. Consequently, under fairly stationary conditions, no current is consumed by the system and the necessary drum holding force is provided only by the friction brake. When the rope slackens so that its pull on the winch drum drops below a minimum value, the shaft 82 of the tensiometer gearing 2 turns the switch 80 in the heave-in direction. Switch 80 then passes through positions 1 and 2 and may reach the position 3. When passing through position 1, heave-in, the switch 80 prepares two circuits: one for coil 17 of relay H, and another one for coils 45, 49 of contactors 2M and 20M. These circuits extend through the self-holding contact 8 of the brake relay BR; but since contact 8 is then open, neither relay H nor contactors 2M and 20M pick up. As soon as switch 80 reaches position 3, heave-in, the two coil circuits are closed at contact 8 as follows: The circuit for coil 17 of relay H extends through elements L1—91—60—8—94—80—25—17—92—L2; and the circuit for coils 45 and 49 extends from lead 91 through switch 60 and through contacts 58, 35 to coils 45, 49 and thence through lead 92 to line L2. Relay H and contactors 2M and 20M pick up. Relay H energizes coil 9 of brake relay BR in the circuit L1—91—24—9—92—L2 so that the brake 3 is released while the motor is now energized to run in the heave-in direction substantially in accordance with the characteristic H2 in Fig. 2. Thereafter, the brake relay BR is held in together with relay H because contact 8 is now closed. Relays BR and H are released only when the increasing pull of the rope being heaved-in causes the switch 80 to return to the off position.

When the towing or warping load becomes too great so that the rope tension exceeds the desired maximum value, shaft 81 turns the switch 80 through pay-out positions 1 and 2 to position 3. As switch 80 passes through position 1, a circuit is prepared for coil 34 of contactor 1M and another circuit for coil 26 of relay P. These circuits are completed only when switch 80 reaches the position 2, pay-out. Then the brake is released and contactor 1M connects terminals 11 to the line through contacts 31, 32, 33, resistors 36, 37, 38, contacts 21, 22, 23 and resistors 27, 28, 29. If the amount of rope now being paid out is insufficient to relieve the excessive rope pull, the switch 80 moves farther to position 3. As a result, contactor 1M drops out and contactors 2M and 20M come in. Now the motor terminals 12 are energized for 600 R. P. M. operation with resistors 36, 37, 38 and resistors 27, 28, 29 effective to limit the current and torque of motor M. When due to the paying out of rope, the rope pull and tension decline, switch 80 turns back to the off position but, as during the automatic heave-in performance, the motor becomes deenergized and the brake is set only when switch 80 reaches the off position.

It will be recognized from the foregoing description that when operating at minimum speed in the heave-in direction, the series resistors 36, 37, 38 are connected in the motor circuit and that at medium speed two operating points for heave-in operation are provided, one in which the same series resistors are effective and another in which the resistors are ineffective. If desired, the series resistors may also be made effective when operating at high speed, but no resistance need be inserted if, as assumed in the illustrated embodiment, the high speed winding of the motor has sufficient inherent resistance to prevent high current peaks. When paying out at low and medium speed, the same resistors 36, 37, 38 are effective but, in addition, the resistors 27, 28, 29 are also series connected in the motor circuit and remain in that circuit regardless of the selected motor speed. This has the following result. When heaving-in, the motor overcomes rope pull plus winch friction. When paying out, the rope pull overcomes motor torque plus winch friction. Hence, if the maximum torque of the motor were the same for paying out and heaving-in, the pull and tension of the rope would be much higher when paying out than when heaving in so that the rope strength is either not sufficiently utilized during heave-in operation or the rope is exposed to danger of overstress when paying out. However, by virtue of the increased resistance of the motor circuit during pay-out performance and the limitation thus imposed on the motor torque, the rope can be stressed the permissible maximum value when heaving-in without exceeding this value during pay-out performance.

Another advantage during pay-out performance is the fact that it limits the motor current if the rope is pulled off the drum at high speed and the motor, while connected to the low speed winding, is being overhauled at high speed.

While some possibilities of modifying the system have been mentioned in the foregoing, it will be understood by those skilled in the art after a study of this disclosure, that other changes especially as regards the design, arrangement, and circuit connections of the system components can be made without obviating the objects and advantages of the invention and without departing from the essential features of the invention as set forth in the claims annexed hereto.

I claim as my invention:

1. An electric winch control system, comprising a multi-speed alternating-current winch motor having a plurality of terminal groups for operating at different speeds respectively, alternating-current supply lead for energizing said motor, a plurality of contactors connected to said terminal groups respectively, two reversing relays, each being connected between said leads and said contactors, said relays having different respective polarities of connection for controlling said motor to run in heave-in and pay-out directions respectively, a multi-position selector switch connected to said relays and said contactors for selectively controlling them to connect one of said terminal groups at a time through one of said respective contactors and one of said respective relays to said leads so that running direction and speed of said motor depend upon the selected position of said switch, and resistance means series-connected between said terminal groups and said leads under control by one of said relays so as to be active only when said motor is connected for paying out performance.

2. An electric winch control system, comprising a multi-speed alternating-current winch motor having a plurality of terminal groups for operating at different speeds respectively, alternating-current supply leads for energizing said motor, a plurality of contactors each having a control coil and contacts controlled by said coil and connected to one of said respective terminal groups, a heave-in relay and a pay-out relay having respective control coils and having respective contact means disposed between said leads and said contactor contacts, said two relay contact means having different respective polarities of connection for controlling said motor to run in heave-in and pay-out directions respectively, resistance means series-connected with said contact means of said pay-out relay between said leads and said capacitor contacts, and a multi-position selector switch connected to said coils for selectively controlling said relays and said contactors to connect at a time one of said respective terminal groups to said leads through the contacts of one of said respective contactors and the contact means of one of said respective relays.

3. An electric winch control system, comprising a multi-speed alternating-current winch motor having a plurality of terminal groups for operating at different speeds respectively, alternating-current supply leads for energizing said motor, control means disposed between said terminal groups and said leads and having a multi-position selector switch for connecting said leads to one of said respective terminal groups at a time, resistance means series-connected between one of said terminal groups and said leads, and circuit means connecting said resistance means with said selector suitable for controlling said resistance means to be active in one position and inactive in another position of said switch, said leads being connected to said one terminal group in both latter positions of said switch.

4. An electric winch control system, comprising a multi-speed alternating-current winch motor having a plurality of terminal groups for operating at different speeds respectively, alternating-current supply leads for energizing said motor, resistance means series-disposed between said motor and said leads, a plurality of contactors each having contacts connected between said leads and one of said respective terminal groups, another contactor having contacts for controlling said resistance means, and a multi-position selector switch connected to said plurality of contactors for controlling them to selectively connect said respective terminal groups to said leads, said switch having two adjacent positions and contact means for causing one of said plurality of contactors to connect the same terminal group to said leads in both adjacent positions and having other contact means connected to said other contactor for controlling said resistance means to be active in only one of said adjacent positions.

5. An electric winch control system, comprising a multi-speed alternating-current winch motor having a plurality of terminal groups for operating at different speeds respectively, alternating-current supply leads for energizing said motor, reversing contact means disposed between said leads and motor for controlling the running direction of said motor, two selector switches each with a multi-position switch member having an "off" position and two groups of active positions on both sides of said off position, each of said members having contact means connected to said reversing means to determine the running direction of said motor in accordance with the selected group of contact means, a plurality of contactors disposed between said reversing contact means and said respective terminal groups and connected to said two members so as to connect said respective terminal group, one at a time, to said leads when either member is in respective active positions, one of said switch members being manually operable and having another position and having additional contact means connected to said other switch to render said other switch effective only when said manually operable member is placed in said other position, and actuating means connected with said motor and having a movable member controlled in dependence upon a winch operating condition and connected to said other switch member for automatically operating the latter in order to maintain said condition with given limit values.

6. An electric winch control system, comprising a multi-speed alternating-current winch motor having a plurality of terminal groups for operating at different speeds respectively, alternating-current supply leads for energizing said motor, reversing contact means disposed between said leads and said motor for controlling the running direction of said motor, two selector switches each with a multi-position switch member having an "off" position and two groups of active positions on both sides of said off position, each of said members having contact means connected to said reversing means to determine the running direction of said motor in accordance with the selected group of contact means, a plurality of contactors disposed between said reversing contact means and said respective terminal groups and connected to said two members so as to connect said respective terminal group, one at a time, to said leads when either member is in respective active positions, one of said switch members being manually operable and having another position and having additional contact means connected to said other switch to render said other switch effective only when said manually operable member is placed in said other position, a winch drum mechanically connected to said motor, and a tensiometric device interposed between said drum and said motor and having a reversibly movable output element connected to said other switch member for automatically positioning the latter in the direction required to maintain the winch pull within given limit values.

7. An electric winch control system, comprising a multi-speed alternating-current winch motor having a plurality of terminal groups for operating at different speeds respectively, alternating-current supply leads, a plurality of contactors disposed between said leads and said respective terminal groups, reversing relay means disposed between said contactors and said leads for controlling the running direction of said motor, a selector switch having an off position and two groups of active positions on both respective sides of said off position, a tensiometric device associated with said motor and having a reversibly movable element connected to said switch for positioning said switch, a brake associated with said motor, a brake relay disposed for controlling said brake and having a normally open self-holding circuit, said switch having contact means connected through said self-holding circuit to said contactors and to said reversing relay means and disposed for controlling said contactors and relay means when said self-holding contact is closed, to connect one of said respective terminals at a time to said leads so that said motor runs in a direction determined by the selected group of contacts, said switch having other contact means connected with said brake relay and disposed to energize said brake relay when said switch is in an active position other than those immediately adjacent to said off position so that said brake is released and said motor energized only when said switch has passed from the off position through an adjacent position but remains released and energized, due to said self-holding circuit, when thereafter said switch turns back to the adjacent position until it reaches the off position.

KURT MAHNKE.

REFERENCES CITED

The following references are of record in the file of this patent:

UNITED STATES PATENTS

| Number | Name | Date |
|---|---|---|
| 2,393,048 | Mahnke | Jan. 15, 1946 |
| 2,414,473 | Mahnke | Jan. 21, 1947 |